United States Patent [19]
Mercer

[11] 3,955,357
[45] May 11, 1976

[54] TOBACCO HARVESTER DEVICE

[75] Inventor: Clarence C. Mercer, Walstonburg, N.C.

[73] Assignee: Harrington Manufacturing Company, Lewiston, N.C.

[22] Filed: Sept. 23, 1974

[21] Appl. No.: 508,608

[52] U.S. Cl. .............................................. 56/27.5
[51] Int. Cl.² ........................................ A01D 45/16
[58] Field of Search ..................................... 56/27.5

[56] References Cited
UNITED STATES PATENTS
| | | | |
|---|---|---|---|
| 3,780,507 | 12/1973 | Chapman | 56/27.5 |
| 3,841,071 | 10/1974 | Pinkham et al. | 56/27.5 |

*Primary Examiner*—Hugh R. Chamblee
*Attorney, Agent, or Firm*—Fred Philpitt

[57] ABSTRACT

An improved tobacco harvester which is provided with a novel arrangement of cutters disposed rearwardly of the defoliator section of the harvester.

2 Claims, 5 Drawing Figures

TOBACCO HARVESTER DEVICE

BACKGROUND

Automatic tobacco harvesters are now a commercial reality and are being used by an increasing number of tobacco farmers because of both the scarcity and high cost of competent labor. All of the harvesters now on the market involve a framework which provides an elongated front-to-rear passageway for tobacco plants, with defoliating means on each side of this passageway. The leaf defoliating means is designed to strip leaves from the tobacco stalks as they pass through said passageway. Some recent patents which describe these types of harvesters in detail are

| | |
|---|---|
| 3,780,507 | 3,406,506 |
| 3,754,382 | 3,093,949 |
| 3,654,753 | 3,083,517 |
| 3,603,064 | 2,876,610 |
| 3,601,959 | 2,834,174 |
| 3,507,103 | 2,816,411 |
| 3,417,556 | |

Figure 1:
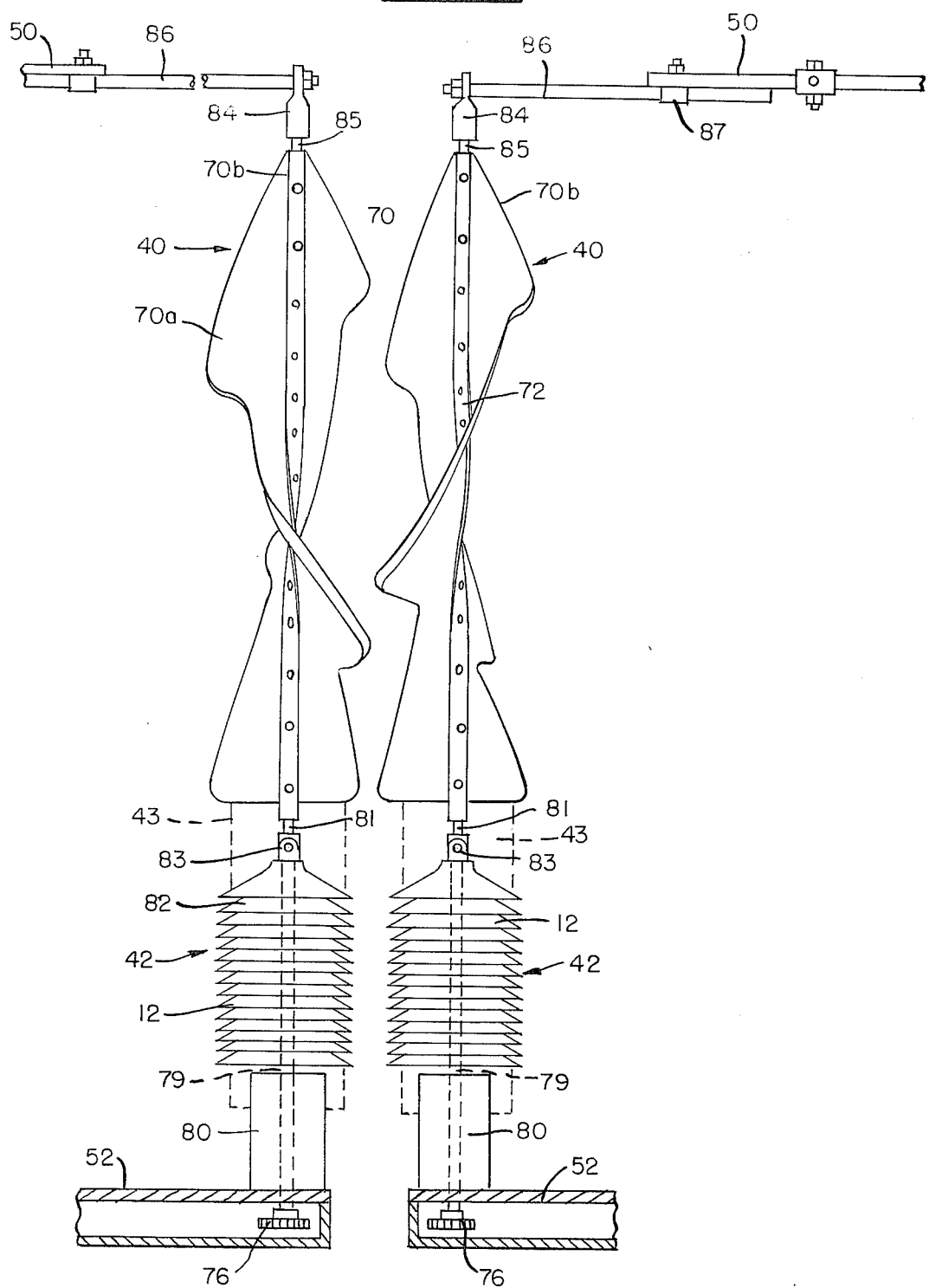
Figure 2:
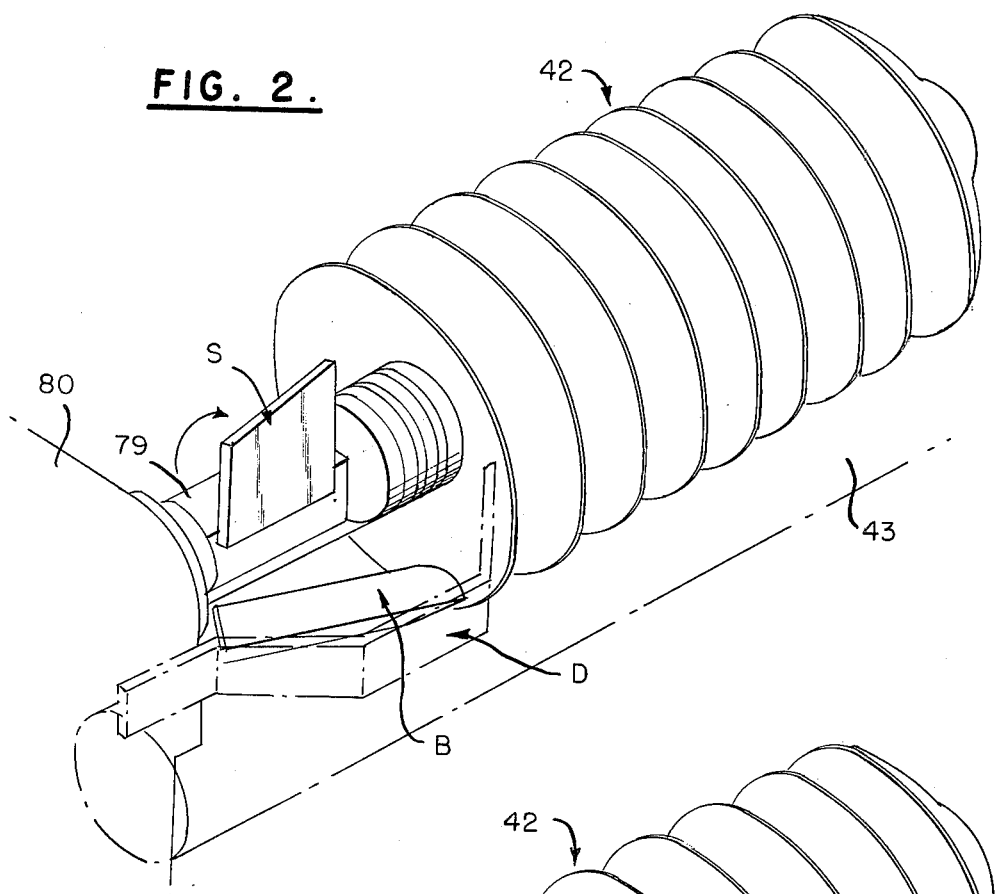
Figure 3:
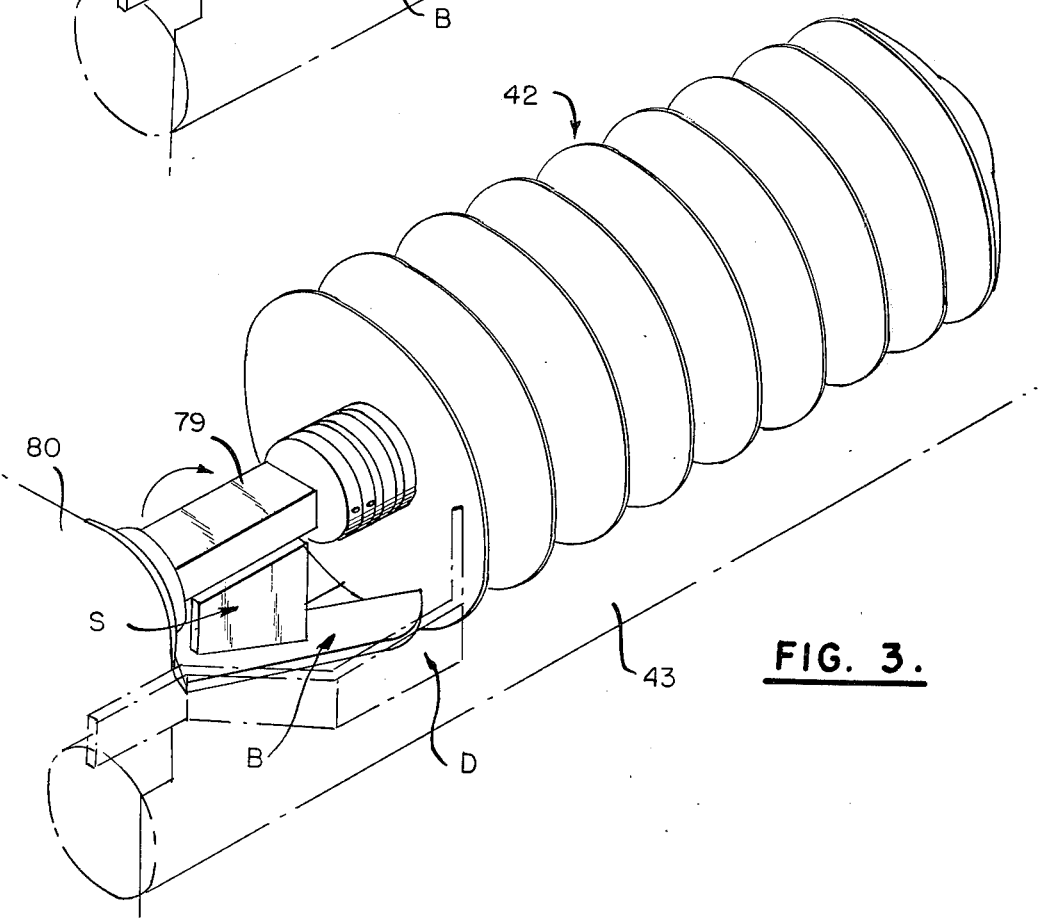
Figure 4:
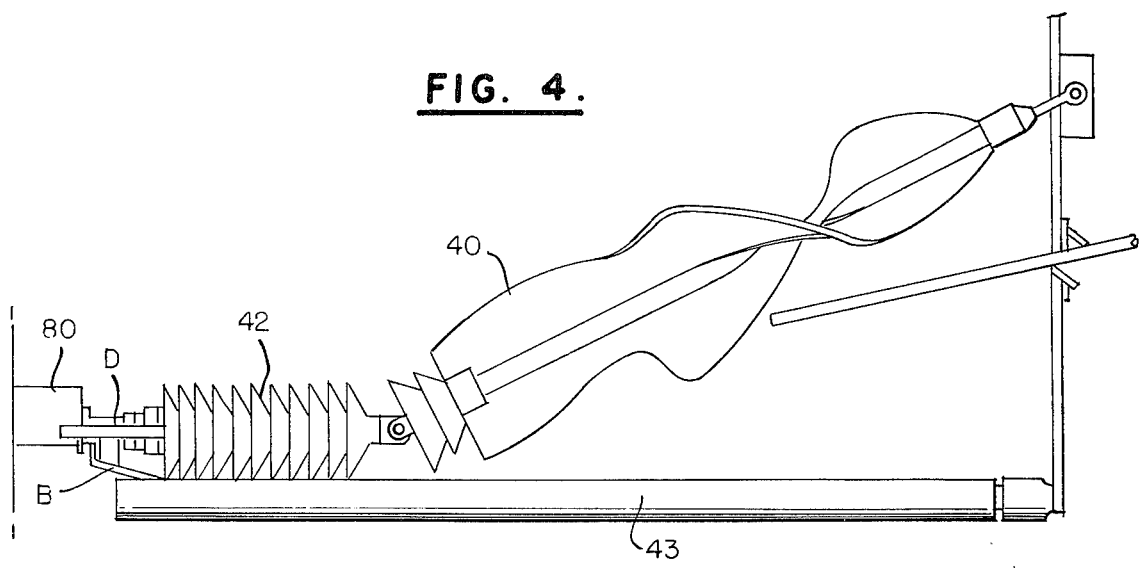
Figure 5:
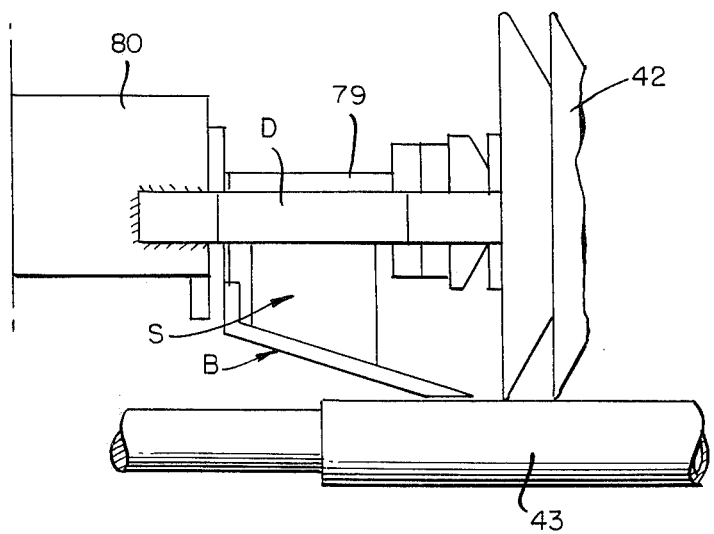

FIG. 1 is a plan view of a pair of defoliators that form a part of the prior art; and FIG. 2 is a perspective view of a defoliator containing cutting elements in accordance with this invention.

The tobacco harvester which has been sold to tobacco farmers in the greatest numbers is the Roanoke Automatic Tobacco Primer (which is currently being manufactured by the Harrington Manufacturing Company and is described in the attached "Operator's Service and Parts Manual No. 1745" which is incorporated herein by reference). This harvester includes a defoliating section, a gleaning (or salvaging) section and a lateral leaf conveying section. The principle of the defoliating and gleaning sections of this known type of tobacco harvester is illustrated in FIG. 1. In this figure a pair of defoliators 40 are shown and each defoliator comprises a web 70 having scalloped edges 70a and 70b held within a helical twisted shaft 72 so that the web itself retains a helical twist. The defoliators 40 are preferably arranged with their scalloped edges in a staggered relationship. The scallops on the opposite edges 70a and 70b are out of phase. Thus the edges 70a on the left as seen in FIG. 1 are formed with a radius gradually increasing from the front toward the rear, followed by an abrupt decrease, whereas the edges 70 b on the right are formed with a radius increasing, followed by an abrupt decrease, which decrease is spaced axially ahead of the decrease in radius of the edges 70a. Consequently, when the defoliators are operating to engage a tobacco plant, a longitudinal edge on one defoliator characterized by an abruptly increasing radius engages the plant stalk opposite a longitudinal edge on the other defoliator exhibiting a gradually increasing radius. In other words, when a projecting scallop engages one side of a stalk, its opposite side is engaged by a recess between scallops on the web of the other defoliator. It has been found that with such a staggered configuration for the scalloped edges, there is substantially less damage to the tobacco stalks.

Immediately to the rear of each defoliator 40 is a gleaner or scavenger, generally indicated as 42. Each gleaner 42 is carried on a square shaft 79 extending through a spacer sleeve 80 and each gleaner comprises a stack of sponge rubber discs 82 which are generally cup-shaped, with their inner concave surfaces facing rearwardly of the harvester. This gleaning or scavenging means is desirable because when the defoliators 40 engage the tobacco leaves, they primarily act to break the leaves from the stalks. However, the webs of the defoliators, being relatively hard and smooth-surfaced, slip readily over the surfaces of the tobacco stalks and leaves, and may occasionally allow some leaves to remain connected to the stalk by a thread-like filament.

It has also been found that improved scavenging is accomplished by having the gleaners 42 cooperate with an idler roller 43 (indicated by dashed lines in FIG. 1) and located under the gleaners so as to form a nip, thereby nipping or pinching any remaining leaves from the stalk. It will thus be appreciated that an efficacious clinging grip is promoted by reason of the fact that the gleaner discs 82 are of the configuration illustrated, and at the same time because of their cooperation with the idler rollers 43 any "hanging" leaves are efficiently removed from the stalks with minimal bruising of the stalks.

The forward end of each shaft 79 is connected through a universal joint 83 to a stub shaft 81, whose forward end is in turn connected to the twisted shaft 72 of a defoliator 40. The forward end of each shaft 72 is connected to another stub shaft 85, which is journaled in a bearing 84 affixed to a support arm 86, which in turn is rigidly secured to the main frame. The elevation of the support arm 86 can be altered so as to change the tilt angle of the defoliators 40 and thereby change the vertical dimension of the swath which is harvested by the machine during a pass along a row of stalks.

The gleaners 42 and defoliators 40 are preferably driven by means of hydraulic motors (not shown) which are coupled to a sprocket and chain arrangement, generally indicated at 76, and rotation of gears 76 by the hydraulic motors will rotate shafts 79, 81 and 85. These hydraulic motors may be controlled by any suitable means, not shown, in order that the operator may control the speed of rotation of the defoliators 40, the gleaners 42 and associated lateral leaf conveying means.

THE PROBLEM

A problem sometimes encountered with the arrangement shown in FIG. 1 is that some tobacco stalks, instead of passing between the defoliators and gleaners, will become caught or jammed between the various sections or parts of the gleaner or defoliator. This can occur when the tobacco stalk has been bent or is quite crooked, or the wind is windblown, or for a variety of other reasons. When it does occur it interferes with the proper operation of the harvester and may result in broken parts and/or impeded leaf harvesting operation.

THE PRESENT INVENTION

The present invention provides a construction which is capable of taking care of stalk jamming before it can become a problem. In essence it involves the placement of rotating cutting means at those locations where stalks might lodge themselves, so that when stalks do enter such an area they are immediately chopped into small pieces and either fall to the ground or are conveyed with the defoliated leaves to the harvester leaf collection section.

FIGS. 2 – 5 illustrate a preferred embodiment of my invention wherein a shear blade S is affixed to the shaft 79 of each gleaner section (e.g. by welding). This shear blade S is designed to cooperate with a shearing base B that is attached to the spacer sleeve 80 or to some other non-rotating portion of the harvester frame. A deflector D is also attached to the spacer sleeve 80, or to some other non-rotating portion of the harvester frame and functions to deflect "good" stalks away from the area. When crooked stalks do get caught or jammed into the gleaner area the cooperative action of the shear blade S and the shearing base B will cut or chop the stalk into small pieces, which will usually drop to the ground. This construction is very rugged and is capable of taking care of the thick and tough tobacco stalks that are frequently encountered.

The exact location of the shear blades isn't critical, except that they should be positioned at one or more points behind the back end of the defoliators 40.

In conclusion, while the foregoing specification and drawing describe the construction, operation and use of one preferred embodiment of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly, it is intended to encompass all changes, variations, modifications and equivalents falling within the scope of the appended claims.

I claim:

1. In the known type of tobacco harvester which includes two laterally spaced apart elongated defoliators, each elongated defoliator having a web that is adapted to rotate about an elongated axis, and a drive shaft connected to the rear end of each defoliator so as to rotate each defoliator about its elongated axis, the improvement which comprises
    a. a shear blade mounted on each drive shaft, said shear blade being adapted to rotate when said drive shaft rotates, and
    b. a shear base fixed to a non-rotating portion of the tobacco harvester and adapted to cooperate with said shear blade to cut stalks that enter the area between and adjacent to said shear blade and shear base.

2. A tobacco harvester according to claim 1 wherein each said drive shaft also contains gleaner members.

* * * * *